United States Patent
Stearns et al.

(10) Patent No.: US 12,005,877 B2
(45) Date of Patent: Jun. 11, 2024

(54) ELECTRIC OVER HYDRAULIC BRAKE SYSTEM WITH MAGNETIC SENSOR

(71) Applicant: TRP International, LLC, Elkhart, IN (US)

(72) Inventors: Nathaniel Stearns, San Jose, CA (US); Cameron Fritts, Rensselaer, IN (US); Mitchell Bruce Pohlman, Glen Ellyn, IL (US); Kamran Naveed Ahmed, Novi, MI (US); Jason Swetlik, Dyer, IN (US); Jonathan Lowe, West Lafayette, IN (US); Jacob Galvan, Schererville, IN (US); Nithin Somenhalli, Bridgewater, NJ (US); William Bennett, Naperville, IL (US); Wesley Thomas DeMonia, Mishawaka, IN (US)

(73) Assignee: TRP International, LLC, Elkhart, IN (US)

( * ) Notice: Subject to any disclaimer, the term of this patent is extended or adjusted under 35 U.S.C. 154(b) by 640 days.

(21) Appl. No.: 17/313,544

(22) Filed: May 6, 2021

(65) Prior Publication Data

US 2021/0370892 A1    Dec. 2, 2021

Related U.S. Application Data

(60) Provisional application No. 63/020,922, filed on May 6, 2020.

(51) Int. Cl.
*B60T 7/20*    (2006.01)
*B60D 1/24*    (2006.01)
(Continued)

(52) U.S. Cl.
CPC .............. *B60T 7/20* (2013.01); *B60D 1/242* (2013.01); *B60T 8/329* (2013.01); *B60T 8/34* (2013.01);
(Continued)

(58) Field of Classification Search
CPC ........ B60T 7/20; B60T 13/662; B60T 8/1708; B60T 8/323; B60T 1/065; B60T 8/34;
(Continued)

(56) References Cited

U.S. PATENT DOCUMENTS

| 4,196,936 A | 4/1980 | Snyder |
| 4,840,256 A * | 6/1989 | Webb ...................... B60T 7/20 |
| | | 280/446.1 |

(Continued)

FOREIGN PATENT DOCUMENTS

| WO | WO9939952 | 8/1999 |
| WO | WO2003018380 | 3/2003 |

OTHER PUBLICATIONS

British Patent No. GB 2289508 to Golden published on Nov. 22, 1995.*

*Primary Examiner* — Pamela Rodriguez
(74) *Attorney, Agent, or Firm* — McHale & Slavin, P.A.

(57) ABSTRACT

A trailer braking system having a surge component used in combination with an electric over hydraulic brake system. The surge component includes a sliding member with a magnetic sensor for detecting trailer deceleration, the sliding member providing an initial pressurization of the hydraulic system. A trailer mounted electrical circuit detects when the tow vehicle brakes are applied and includes a microcontroller for detecting the speed of deceleration provided by the magnetic sensor. A trailer mounted electric motor receives a signal from the circuit board to vary pressure to the brakes in accordance with the speed of deceleration.

14 Claims, 17 Drawing Sheets

(51) Int. Cl.
*B60Q 1/44* (2006.01)
*B60T 1/06* (2006.01)
*B60T 8/32* (2006.01)
*B60T 8/34* (2006.01)
*B60T 13/20* (2006.01)
*B60T 13/66* (2006.01)
*B60T 17/22* (2006.01)
*B62D 63/06* (2006.01)
*B62D 63/08* (2006.01)
*G01P 15/105* (2006.01)

(52) U.S. Cl.
CPC ............ *B60T 13/20* (2013.01); *B60T 13/662* (2013.01); *B60T 17/221* (2013.01); *B62D 63/062* (2013.01); *G01P 15/105* (2013.01); *B60Q 1/44* (2013.01); *B60T 1/065* (2013.01); *B60T 1/067* (2013.01); *B60T 2250/00* (2013.01); *B60T 2270/88* (2013.01); *B62D 63/08* (2013.01)

(58) Field of Classification Search
CPC .... B60T 1/067; B60T 17/221; B60T 2270/88; B60T 13/20; B60T 8/329; B60T 2250/00; B62D 63/062; B62D 63/08; B60D 1/242; B60Q 1/44; G01P 15/105; G01P 7/00
See application file for complete search history.

(56) References Cited

U.S. PATENT DOCUMENTS

| | | | |
|---|---|---|---|
| 5,080,445 A | | 1/1992 | Brearley et al. |
| 5,286,094 A | | 2/1994 | Milner |
| 5,346,289 A | * | 9/1994 | Cords ............. B60T 13/18 188/150 |
| 5,615,930 A | | 4/1997 | McGrath et al. |
| 5,620,236 A | | 4/1997 | McGrath et al. |
| 5,806,937 A | * | 9/1998 | Brunson ............. B60T 13/686 188/34 |
| 5,876,100 A | * | 3/1999 | Breckner ............. B60T 7/20 303/7 |
| 6,375,211 B1 | | 4/2002 | MacKarvich |
| 7,311,364 B2 | | 12/2007 | Robertson |
| 9,108,601 B2 | * | 8/2015 | Lebsock ............. B60T 7/20 |
| 2002/0180257 A1 | * | 12/2002 | Gill ............. B60T 13/686 303/3 |
| 2019/0337499 A1 | | 11/2019 | Hiller |

* cited by examiner

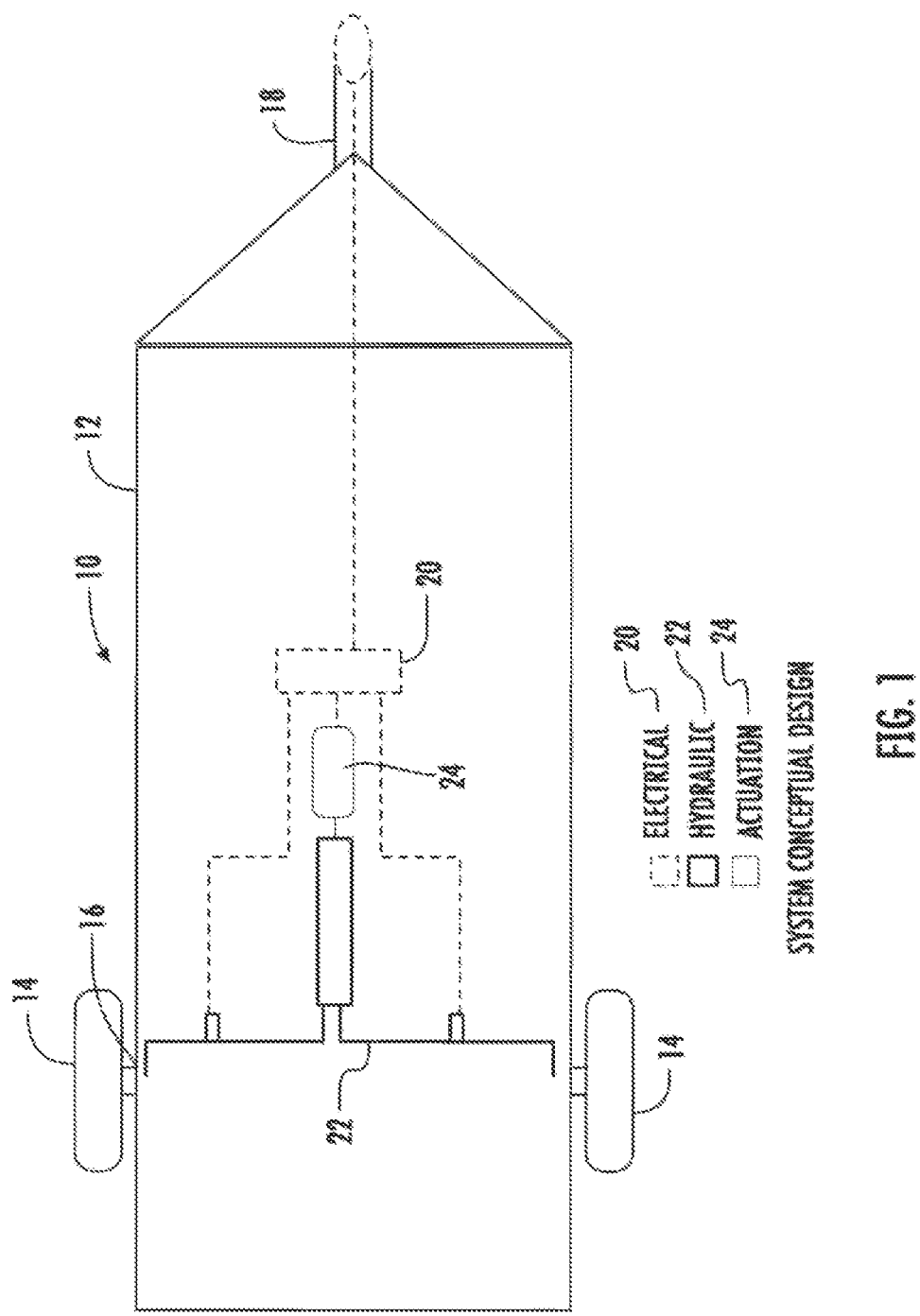

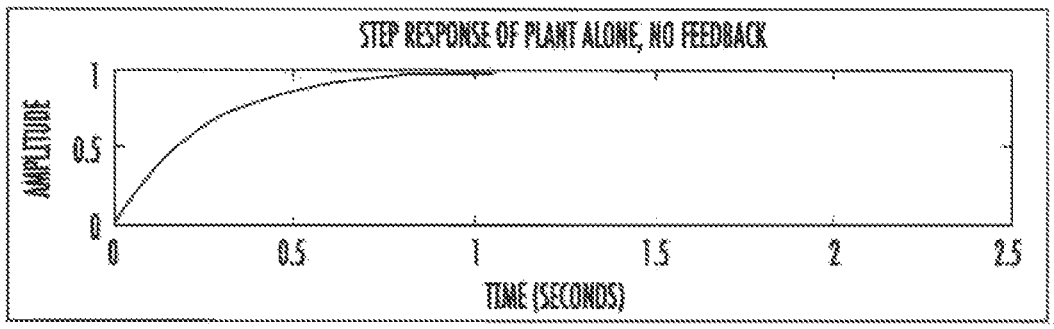
FIG. 15
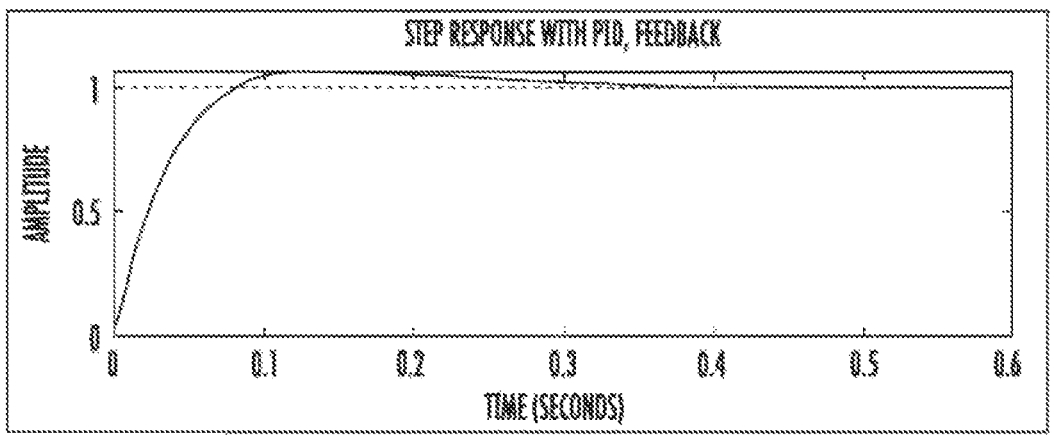
FIG. 16
$$G(s) = \frac{1}{0.25s + 1}$$
$$C(s) = K_p + K_i * \frac{1}{s}$$
$$K_p = 7.17$$
$$K_i = 64.7$$
| | SETTLING TIME (S) | % OVERSHOOT |
|---|---|---|
| PLANT ALONE | 0.978 | 0 |
| PLANT AND CONTROLLER | 0.303 | 7.05 |
FIG. 17

ELECTRIC OVER HYDRAULIC BRAKE SYSTEM WITH MAGNETIC SENSOR

PRIORITY CLAIM

In accordance with 37 C.F.R. § 1.76, a claim of priority is included in an Application Data Sheet filed concurrently herewith. Accordingly, the present invention claims priority to U.S. Provisional Patent Application No. 63/020,922, entitled "ELECTRIC OVER HYDRAULIC BRAKE SYSTEM WITH A MAGNETIC SENSOR", filed May 6, 2020, the contents of which are incorporated hereby by reference.

FIELD OF THE INVENTION

This invention is directed to the field of trailers incorporating brakes and, in particular, an electric over hydraulic brake system with a magnetic sensor.

BACKGROUND OF THE INVENTION

Trailers are used to haul most anything that will fit within the dimensions of the trailer, or serve as a platform for items that may exceed the trailer dimensions. Trailers are typically designed to carry light, medium or heavy loads using a suspension that would be unsuitable for a passenger vehicle, but most effective when a heavy load is added. For instance, a trailer designed to carry a boat has a dedicated purpose, the suspension designed for the weight of the boat and a towing vehicle of a particular size. However, trailers are unique in that, while they can be designed to carry a particular item, or transport up to a certain load, the trailer can be secured to most any type of towing vehicle. The result is that a trailer may be loaded into a condition that is unsuitable for towing by a smaller vehicle. A trailer may be loaded with weight that exceeds the capacity of the towing vehicle. Unfortunately, it is well known that consumers do not weigh every item placed on a trailer, and there is no law that requires the consumer to purchase a particular towing vehicle to pull a trailer. Even if a particular towing vehicle is required, such as a truck with a fifth wheel, the condition of the towing vehicle can change the vehicles towing ability, such as worn brakes, worn tire threads and so forth. Further, road conditions can change the vehicle's towing ability, such as sloped, wet or snow covered pavement. No matter what size the towing vehicle is, if the characteristics of the towing do not match the trailer requirements, the towing vehicle and trailer can form a dangerous combination on the open road.

It is necessary, when towing a trailer, to make sure the towing vehicle is able to stop the forward momentum of the trailer, and that the trailer has the ability to slow or stop itself. If the momentum of a trailer exceeds the braking capacity of the towing vehicle, the trailer will continue with forward movement in respect to the trailer mass, leaving the towing vehicle with reduced braking capacity. Should fast deceleration be required, a trailer may overtake the towing vehicle, resulting in a jackknife condition. Should the pavement be wet, a trailer can easily exceed a towing vehicle's control limitations and become a liability.

Conventional trailer brakes are connected to a towing vehicle brake light circuit, wherein activation of the towing vehicle brakes activates the trailer brakes. The brake light circuit is activated by a switch attached to the brake pedal that detects when the pedal is depressed; the trailer brakes are then activated at a predetermined rate. The predetermined rate does not take into account the petal force or momentum of the trailer, resulting in the trailer brakes being either under-utilized or over-utilized. Should an emergency braking situation occur, the predetermined braking rate may be ineffective and leave the towing vehicle in a dangerous situation.

Trailers attached by a trailer hitch or fifth-wheel hitch can react differently when brakes are applied, especially when the towing vehicle and trailer encounter situational issues such as wet, curved or hilly roads. Without proper balancing of the brakes, the trailer can either push the towing vehicle or cause excessive drag.

In light of the above, it is common practice to equip trailers with brakes. Common braking systems include mechanical override/surge coupling used with mechanical drum brakes or mechanical disc brakes. Hydraulic override/surge couplings are used with hydraulic drum brakes or hydraulic disc brakes. Couplings with a park brake lever are used on electric drum brakes having a trailer mounted brake controller and a cab mounted control unit. The park brake lever can also be used with hydraulic disc brakes by inclusion of an air over hydraulic power unit or an electric over hydraulic power unit. The surge brake is usually found with a hydraulic system to operate drum brakes; tow vehicle input is not required and is problematic when the vehicle is reversing. A trailer brake actuator may include a hydraulic reservoir mounted on the trailer; a hydraulic pump is activated by a signal from the towing vehicle, wherein an electrical input into the hydraulic pump initiates braking of the trailer in response to the braking of the towing vehicle. Electrical brake levers are also well accepted, but require modifications to the towing vehicle.

DESCRIPTION OF THE PRIOR ART

Known prior art includes U.S. Pat. No. 4,196,936, which discloses a pendulum-like inertial sensor connected to an oscillator. U.S. Pat. Nos. 5,620,236 and 5,615,930 sense force on the brakes themselves. U.S. Pat. No. 5,286,094 discloses a compression sensing transducer to control a fluid based braking system. U.S. Pat. No. 5,080,445 discloses a pneumatic sensor on the trailer hitch.

WO 99/39952 discloses a control circuit for trailer brakes which includes a force sensor on a trailer hitch to monitor and control braking force. Closed loop feedback control logic in the control circuit monitors the force exerted by the trailer on the hitch. The feedback control logic governs the application of the trailer brakes to maintain a braking force such that a consistent, predictable force is exerted by the trailer on the towing vehicle through the hitch during braking.

WO2003018380 discloses a brake controller system for a towing vehicle and a towed vehicle. The system has a brake control unit that takes various data readings, which may include temperature of the brake activator and brake fluid pressure. The system then calculates an appropriate amount of brake force and determines whether to supply additional voltage with a voltage booster.

U.S. Pat. No. 7,311,364 discloses an electric brake controller that includes a multi-axis accelerometer that senses deceleration of a towing vehicle along a plurality of directional axes. The controller also includes a microcontroller that is responsive to the sensed decelerations to supply power to trailer brakes that is a function of the deceleration.

U.S. Pat. No. 6,375,211 discloses a surge braking system having a braking/dampening unit integrated with a common reservoir that supplies brake fluid to both a master brake cylinder and a dampener cylinder. If the master cylinder is starved of brake fluid, the dampener is also starved of fluid and the jarring between the forward hitch and the rear housing in response to acceleration and deceleration of the towing vehicle will alert the operator of the towing vehicle to replenish the reservoir with brake fluid.

U.S. Patent Publication 2019/0337499 discloses a trailer brake system that includes a sensor system and a brake control unit. The sensor system is supported by a trailer and includes at least one wheel speed sensor associated with each wheel of the trailer. The brake control unit is configured to: receive sensor data from the sensor system, and receive a brake signal from the tow vehicle indicative of a driver pressing a brake pedal of the tow vehicle. The brake control unit is also configured to: determine, for each brake, a hydraulic pressure based on the sensor data and the brake signal; and apply pressure by way of brake lines to the brake associated with each wheel, based on the hydraulic pressure.

What is lacking in the industry is a braking system that is independent from a tow vehicle, eliminates delay between detection and brake application, has reverse braking capability, has an adjustable brake pressure limit, and is less expensive than conventional brake systems.

SUMMARY OF THE INVENTION

Disclosed is a trailer braking system having a surge component used in combination with an electric over hydraulic brake system. The surge component includes a sliding member with a magnetic sensor. As the trailer decelerates, the mass of the trailer forces the sliding member forward, wherein a cylinder pressurizes the trailer brake system. A trailer mounted electrical circuit board is coupled to the towing vehicle brake light circuit and an electric motor. The circuit board is used to detect when the tow vehicle brakes are applied and includes a microcontroller for detecting the speed of deceleration provided by the magnetic sensor. The trailer mounted electric motor receives a signal from the circuit board to pressurize the hydraulic system and vary pressure to the brakes in accordance with the speed of deceleration.

An objective of the invention is to provide a surge brake for use in combination with an electric over hydraulic brake system.

Another objective of the invention is to teach the use of a coupler mounted brake sliding member having a magnetic sensor attached to a circuit board for reading the speed of deceleration for varying a signal to an electric motor capable of modulating hydraulic pressure to wheel mounted brakes.

Still another objective of the invention is to provide a braking system that has a faster response time than conventional surge brake systems, electric brake systems, or hydraulic brake systems.

Another objective of the invention is to provide a pressure pump operated by an electric motor constructed and arranged to provide an improved variation of pressure to the trailer brakes.

Still another objective of the invention is to provide a trailer mounted braking system that calculates necessary braking force independent of a tow vehicle.

Still another objective of the invention is to provide a braking system that eliminates delay between detection and brake application.

An objective of the invention is to provide a braking system having a magnet sensor system wherein deflection of a rubber spring causes a magnet to move closer to a Hall Effect sensor thereby increasing the magnetic field detected by the sensor.

Yet still another objective of the invention is to provide a braking system that has reverse braking capability.

Another objective of the invention is to provide a trailer mounted brake system that has an adjustable brake pressure limit.

Yet still another objective of the invention is to provide a trailer mounted brake system that is less expensive than conventional brake systems.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

BRIEF DESCRIPTION OF THE FIGURES

FIG. 1 is a pictorial conceptual system design depicting electrical, hydraulic and actuation systems;

FIG. 15 is a graph depicting step response of plant along without feedback, comparing amplitude in seconds;

FIG. 16 is a graph depicting step response with PID, feedback, comparing amplitude in seconds;

FIG. 17 is chart depicting settling time for a plant alone and a plant and controller;

FIG. 18 is a flow diagram force, desired pressure and brake force;

DETAILED DESCRIPTION OF THE INVENTION

Figure 2A:
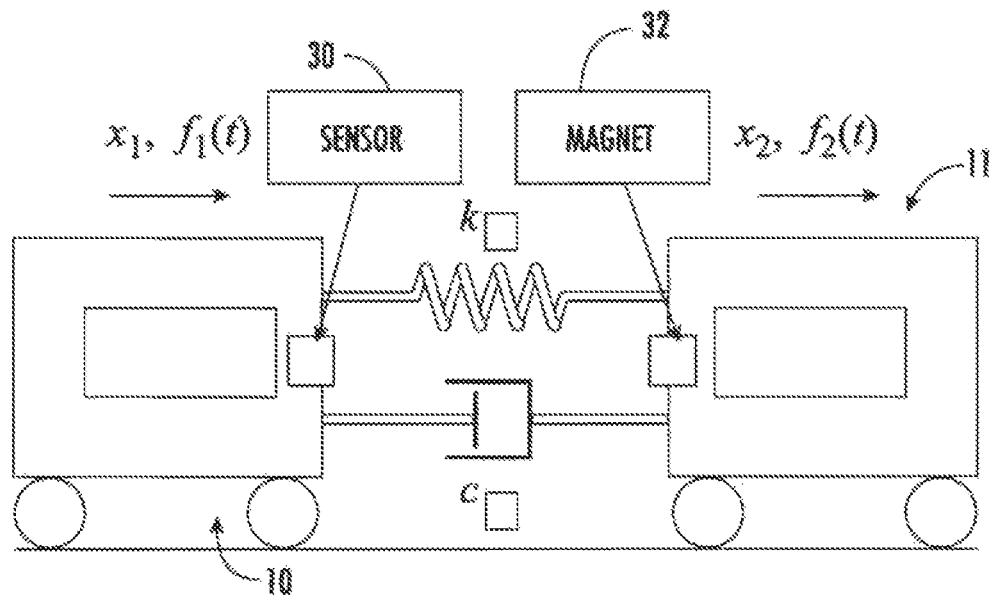
FIG. 2A is a Hall Effect surge brake model.
Figure 2B:
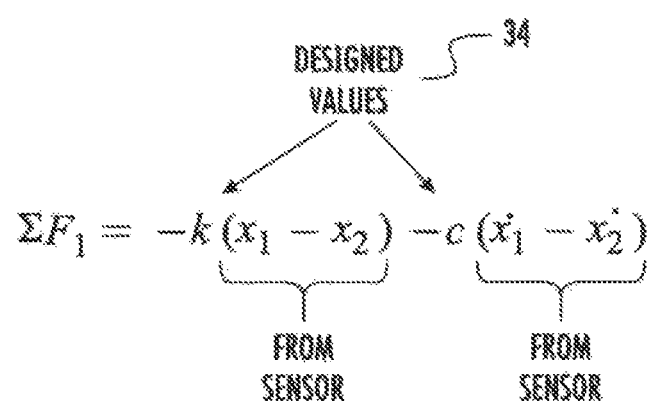
FIG. 2B is the designed values for the Hall Effect surge brake.

Detailed embodiments of the instant invention are disclosed herein, however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Referring to the figures in general, the trailer braking system employs a surge component used in combination with an electric over hydraulic brake system. The braking system comprises a conventional trailer frame. A trailer hitch coupler is positioned at the front of the trailer frame for releasably securing to a towing vehicle. The trailer frame would have at least one axle, with a wheel rotatably secured to each end of the axle, allowing the trailer to be readably towed. A hydraulic surge component is secured to the trailer frame, preferably in combination with the trailer hitch coupler.

A brake mechanism is secured to each wheel. The brake system is preferably a rotor with disc brake calibers. Alternatively, the brake system consists of drums with internal drum brakes. The brake mechanism is fluidly coupled to the hydraulic surge component. A magnetic sensor is attached or formed integral with the hydraulic surge component, the magnetic sensor is constructed and arranged to detect changes in deceleration of the trailer frame.

A brake control unit is electrically coupled to the magnetic sensor system for receiving magnetic sensor trailer frame deceleration data. A microcontroller within the brake control system can be used to interpret the data and calculate hydraulic pressure in response to trailer frame acceleration/deceleration or adjust for trailer frame reversing.

The magnetic sensor is based upon a Hall Effect surge brake to sense compression at the trailer hitch couple to detect vehicle deceleration. A pigtail signal can be used to detect when the tow vehicle is in reverse to override the Hall Effect surge brake. Inertial measurement unit (IMU) is a combination of accelerometers and gyroscopes to detect pitch, yaw and deceleration to further categorize vehicle motion.

A hydraulic actuation system is used to deliver hydraulic pressure to each said brake in response to trailer frame deceleration. The hydraulic actuation system employs the electric motor to operate the pressure pump.

As a general overview, the braking system is a combination of a surge brake system and an electric over hydraulic brake system. The surge brake system has a hydraulic pump in a sliding member of the coupler. As the tow vehicle decelerates, the mass of the trailer farces the sliding member forward at the coupler and the cylinder is depressed, pressurizing the brake system. An electric over hydraulic system ties into the tow vehicle electrical system and senses when the tow vehicle brakes are applied. When the tow vehicle brakes are applied, an electrical signal is sent to an electric motor that pressurizes the brake system. The system uses an electric motor to build pressure in the system but it is tied to a magnetic sensor within a modified surge brake style sliding coupler. The magnetic sensor and related circuit board reads the speed of deceleration and varies the signal to the electric motor to vary the pressure to the brakes. The result is a system having a faster response time than other systems, and will have better variation of pressure to the brakes for improved performance.

In a preferred embodiment, the magnet sensor system wherein deflection of a rubber spring causes a magnet to move closer to a Hall Effect sensor thereby increasing the magnetic field detected by the sensor. A signal from the Hall Effect is used to detect compression of the rubber spring. The compression of the spring can be directly related to a compressive force and the compressive force will be converted to a desired braking force. The braking force is achieved by supplying a specified power to an axial pump.

The system generates hydraulic pressure between 500-1600 psi and will reach 900 psi within 1.0 seconds of an event. The system operates on 12 VDC and will be able to send vehicle acceleration/deceleration data within 0.5 seconds. A 12 VDC motor drives an axial piston pump to supply pressure, a pressure transducer provides feedback and adjust pressure.

The hydraulics will be compatible with DOT 3 or DOT 4 brake fluid and employ a reservoir holding about 16 ounces, and complies with CFR-393 braking requirements. The size of the hydraulic actuator is about 10H×10L×3D. In one embodiment the hydraulic surge component is formed integral with a trailer hitch coupler. Coupling the brake control unit to a tow vehicle brake light circuit allows the brake control unit to be activated when the tow vehicle brake light circuit is activated. The trailer mounted braking system is preferably for use with disc brakes, but may also be adapted for use with drum brakes.

FIG. 1 is a pictorial view depicting a trailer 10 having a frame 12 having a tongue section leading to bifurcated rails on a rear section. The rear section supported by wheels attached to an axle 16 having a wheel and disc brake rotatably coupled to each end of the axle. A trailer hitch coupler 18 depicting positioned at the front of the frame 12. The trailer 10 having an electrical section 20, a hydraulic section 22 and an actuation section 24. FIG. 2A providing a pictorial of a towing truck 11 used for pulling of the trailer 10. The trailer 10 having a sensor 30 coupled thereto which is positioned a predetermined distance from a magnet 32 mounted to the towing truck 11. FIG. 28 depicting the mathematical value 34 of the designed values from the sensor.

Figure 3:
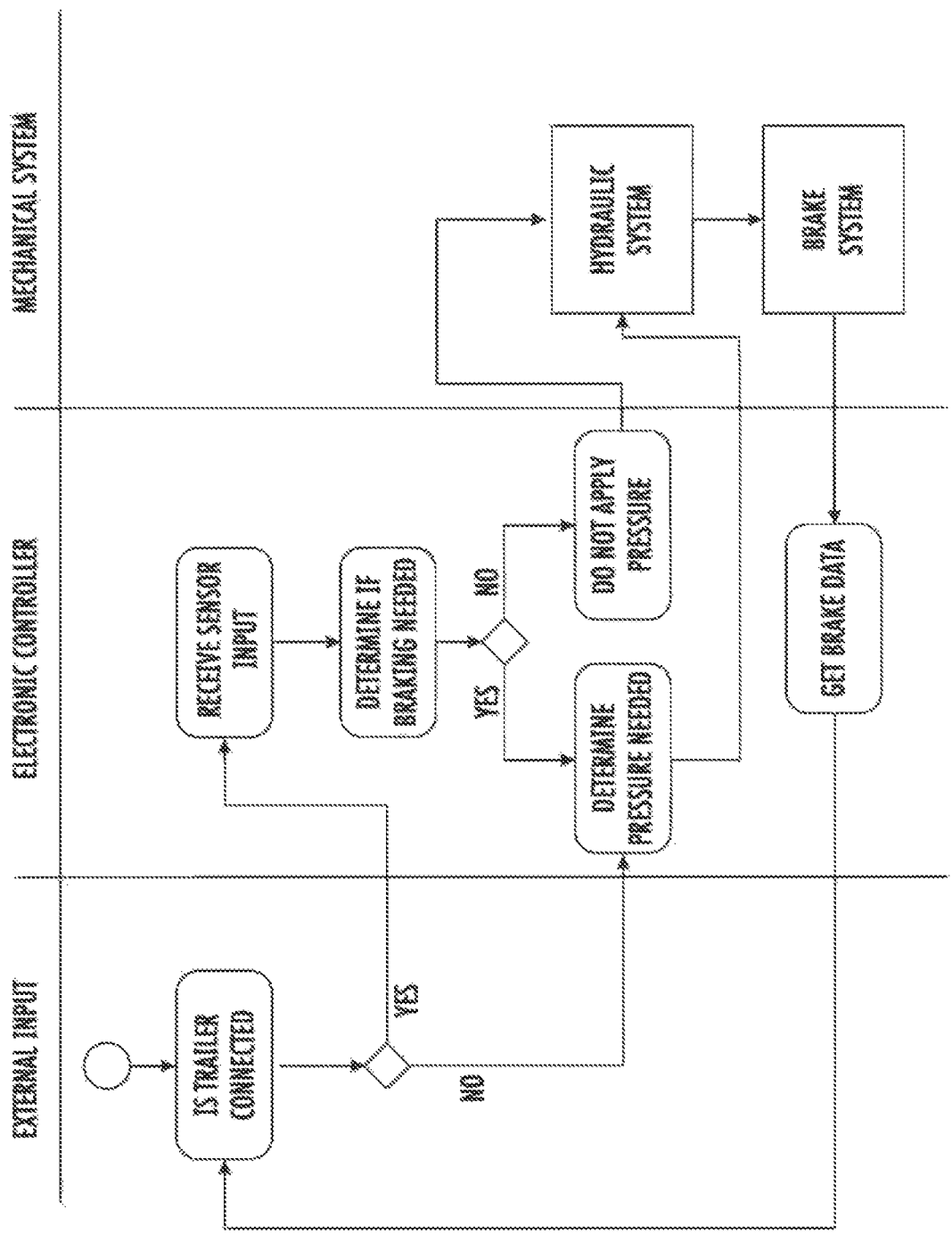
FIG. 3 is a flowchart depicting external input, an electronic controller, and the mechanical system.

FIG. 3 is a flowchart depicting external input, electronic control, and the mechanical system. An external determines if the trailer is connected. If a trailer is connected to a tow vehicle the electronic controller receives an input from a sensor to determine if braking is needed. The controller determines the braking pressure required and employs the hydraulic system for operation of the brake system. The brake system providing braking information to the electronic controller for operational control.

Figure 4:
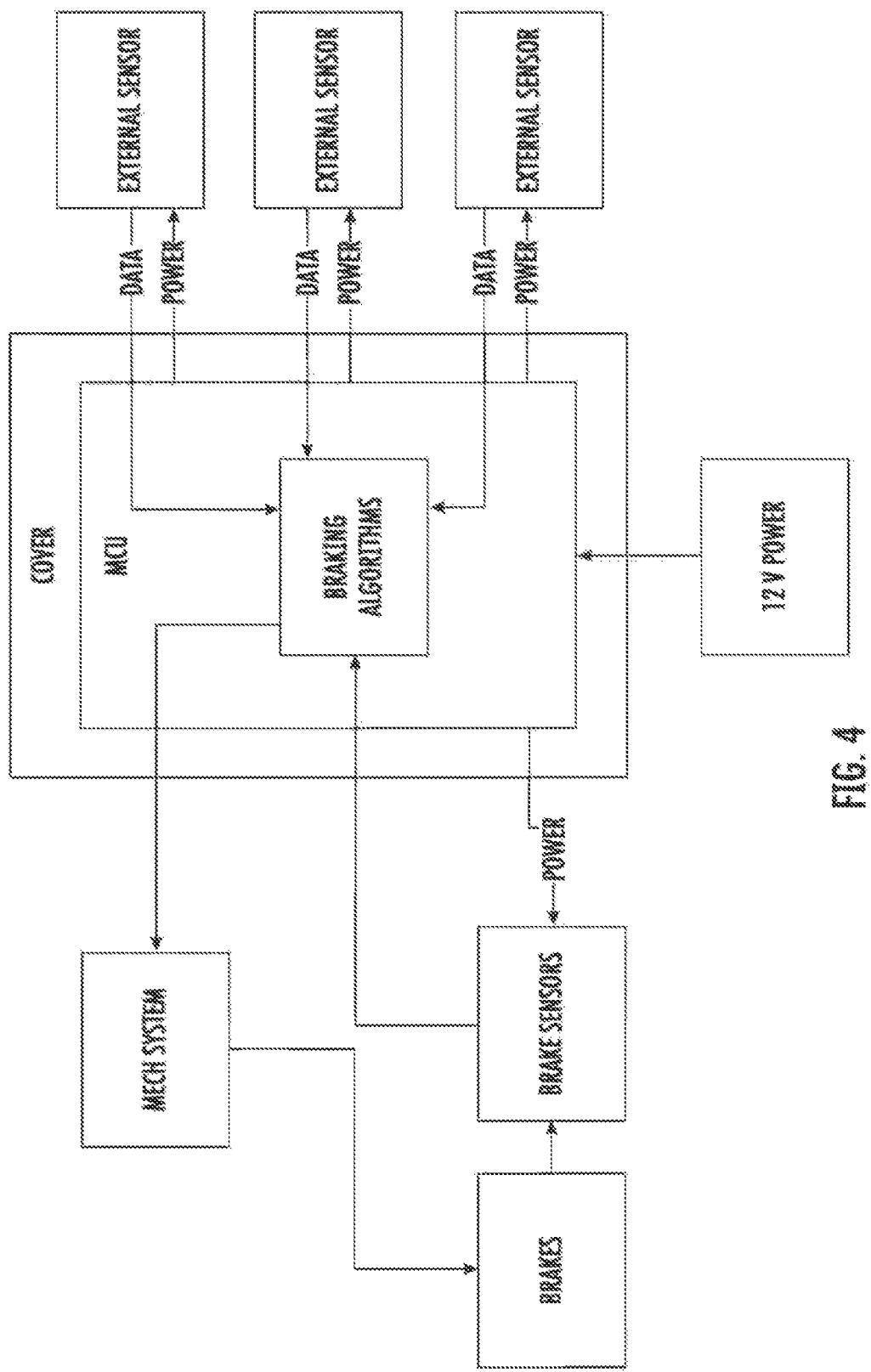
FIG. 4 is a system diagram depicting the data transfer from sensors for braking algorithms.

FIG. 4 is a flow diagram depicting the master control unit MCU coupled to a 12 v power source and containing the braking algorithms. The braking algorithms receive data from a plurality of external sensors including the brake sensors. The braking algorithms provide instructions for operation of the brakes.

Figure 5:
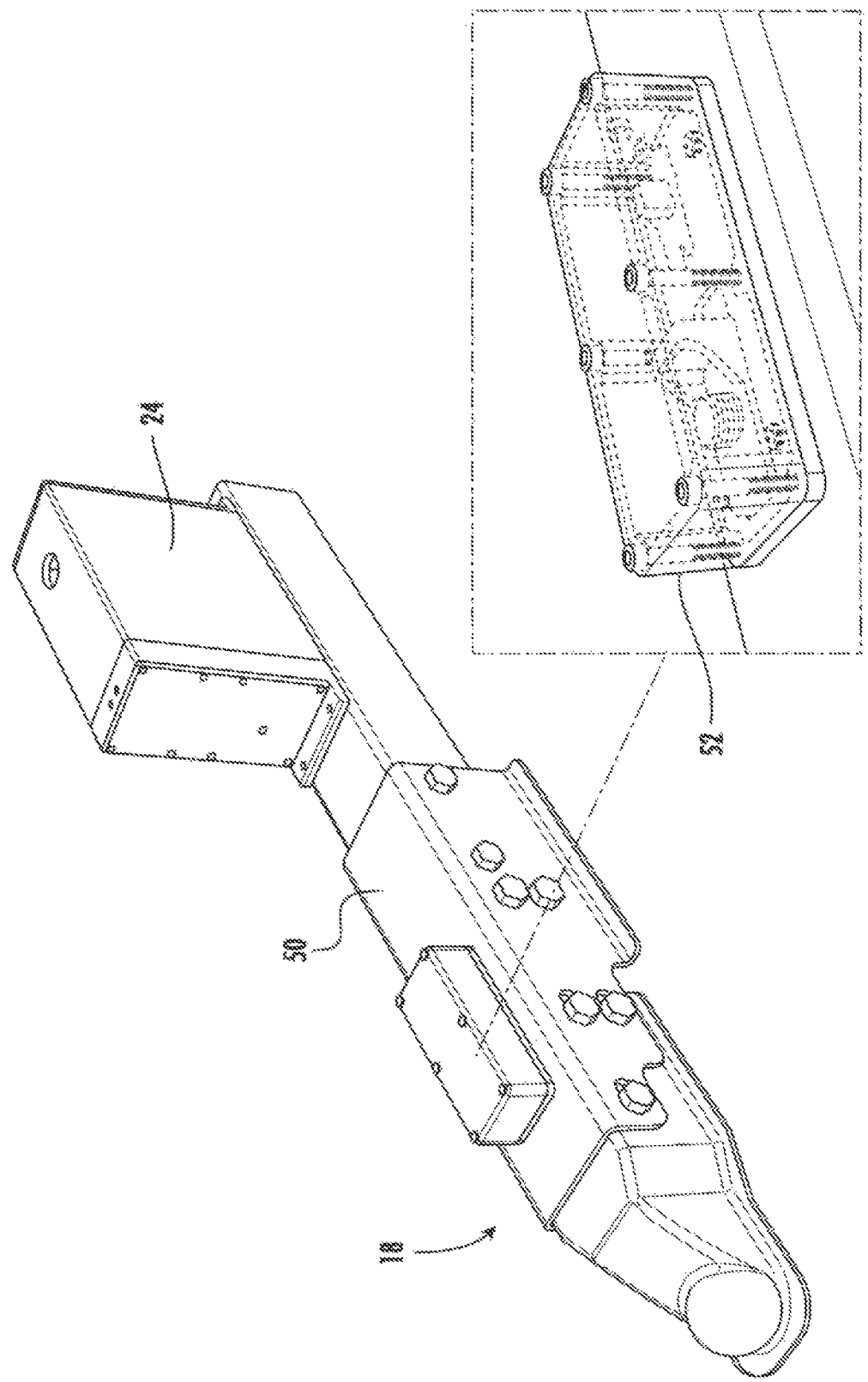
FIG. 5 is a pictorial view of a mounted surge component with an electric over hydraulic brake actuator.
Figure 6:
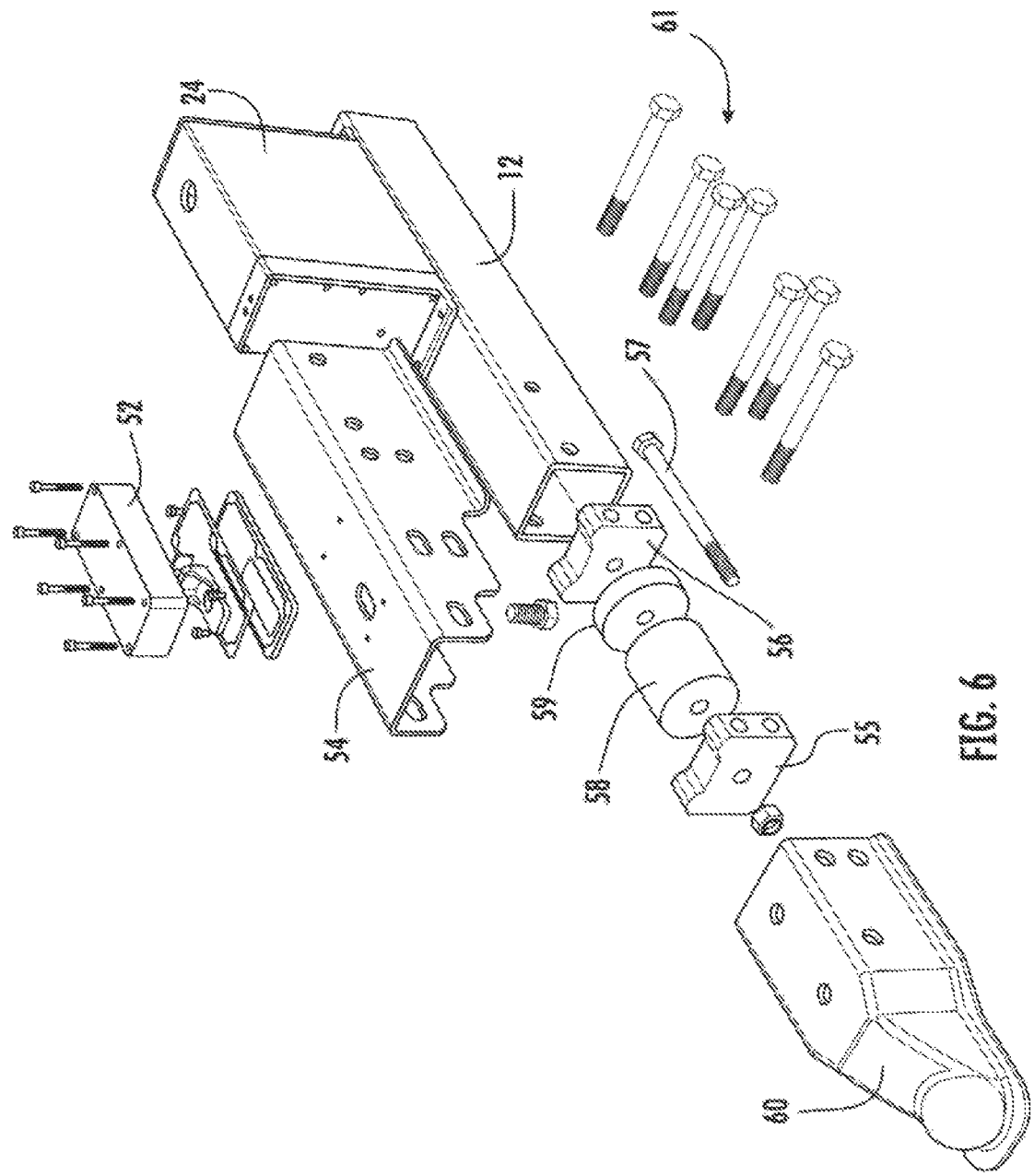
FIG. 6 is an exploded view of the surge component.

Referring to FIGS. 5 and 6, depicted is a trailer hitch coupler 18 with a mounted surge component 50 constructed and arranged to measure vehicle displacement. An electrical housing 52 mounted to the top of the surge component 50 for housing of a controller. An electric over hydraulic brake actuator 24 is secured to the frame 12 for use in generating pressure in the brake lines. The surge component 50 is formed from a sliding coupler 54 having a forward spring retainer 55 and a rearward spring retainer 56 which capture a rubber spring and spring spacer 59 providing an interface between the sliding coupler and a standard 3" trailer coupler 60 with an electric over hydraulic brake actuator. The spring retainers 55 and 56 are assembled with the rubber spring 58 and spring spacer 69 by use of a spring guide pretension bolt 57. A plurality of fasteners 61 secure the trailer coupler 60 to the trailer tongue 12 using the sliding coupler 54.

Figure 7:
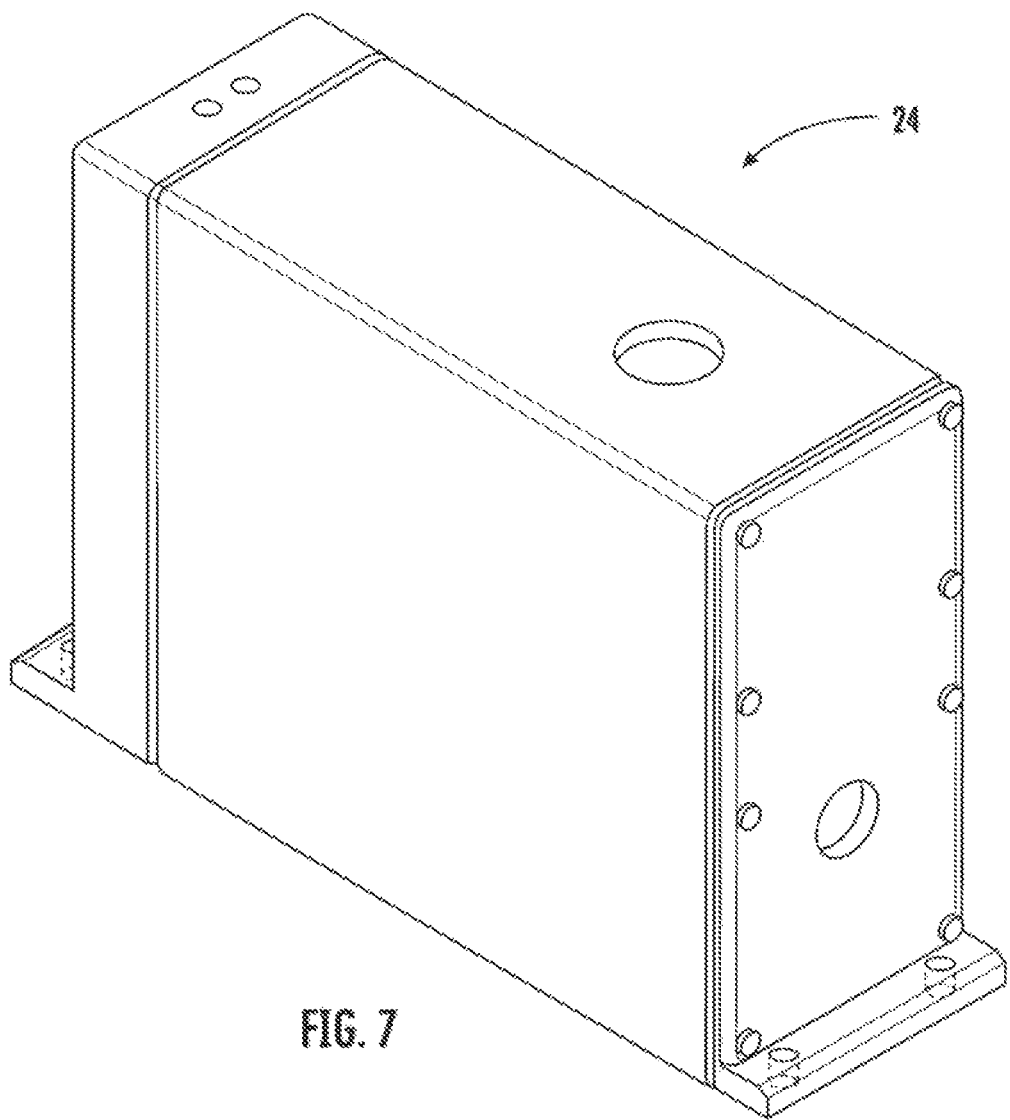
FIG. 7 is a pictorial view of the hydraulic housing.
Figure 8:
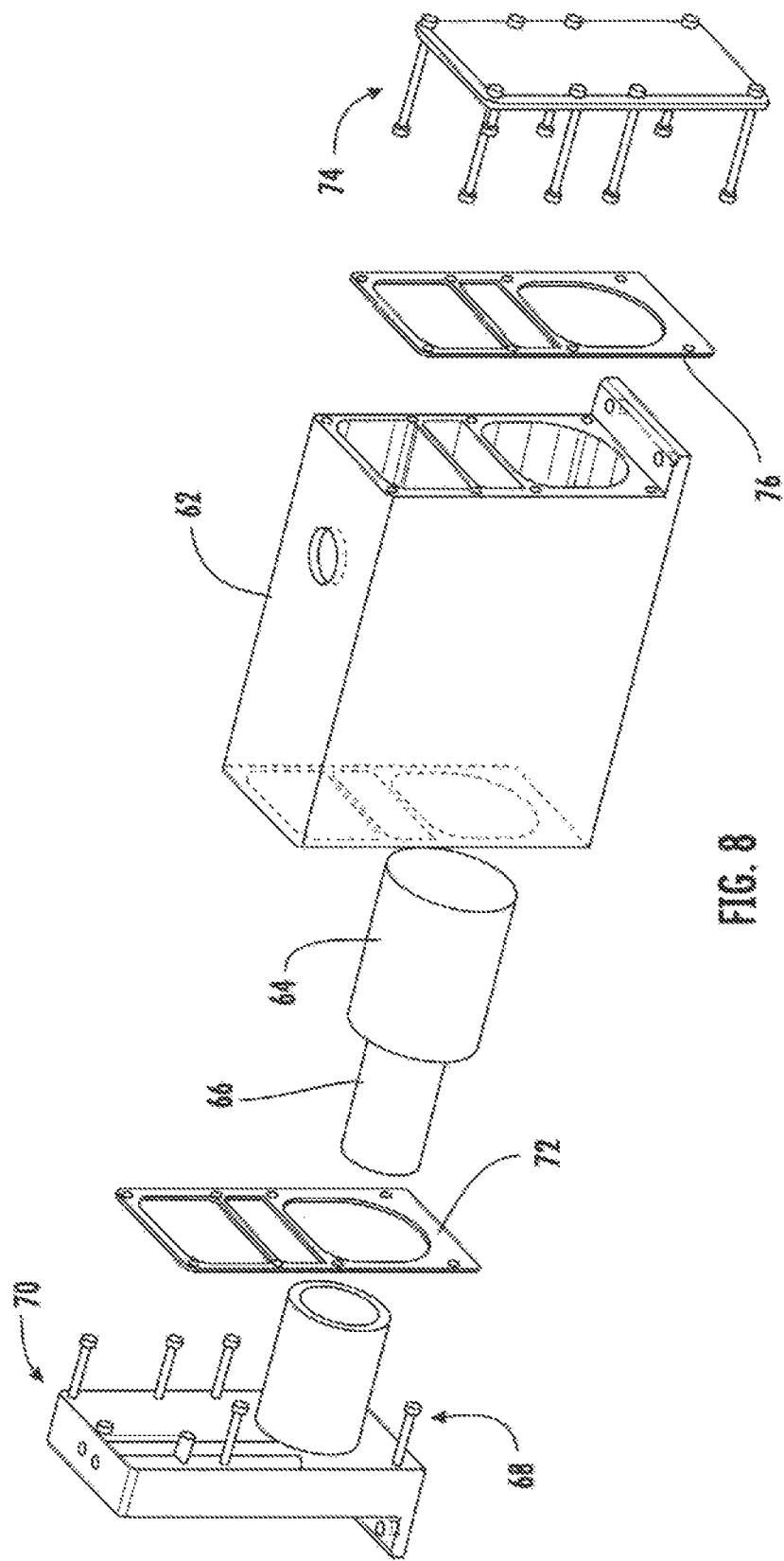
FIG. 8 is an exploded view of the hydraulic housing.

FIGS. 7 and 8 depict the electric over hydraulic brake actuator 24 comprising a housing 62 encasing a 12 VDC motor 64 coupled to a hydraulic pump 66. Pump channels 68 are formed in the left panel 70 sealed to the housing 62 with a first cork seal 72. A right panel 74 is sealed to the housing 62 with a second cork seal 76.

Figure 9:
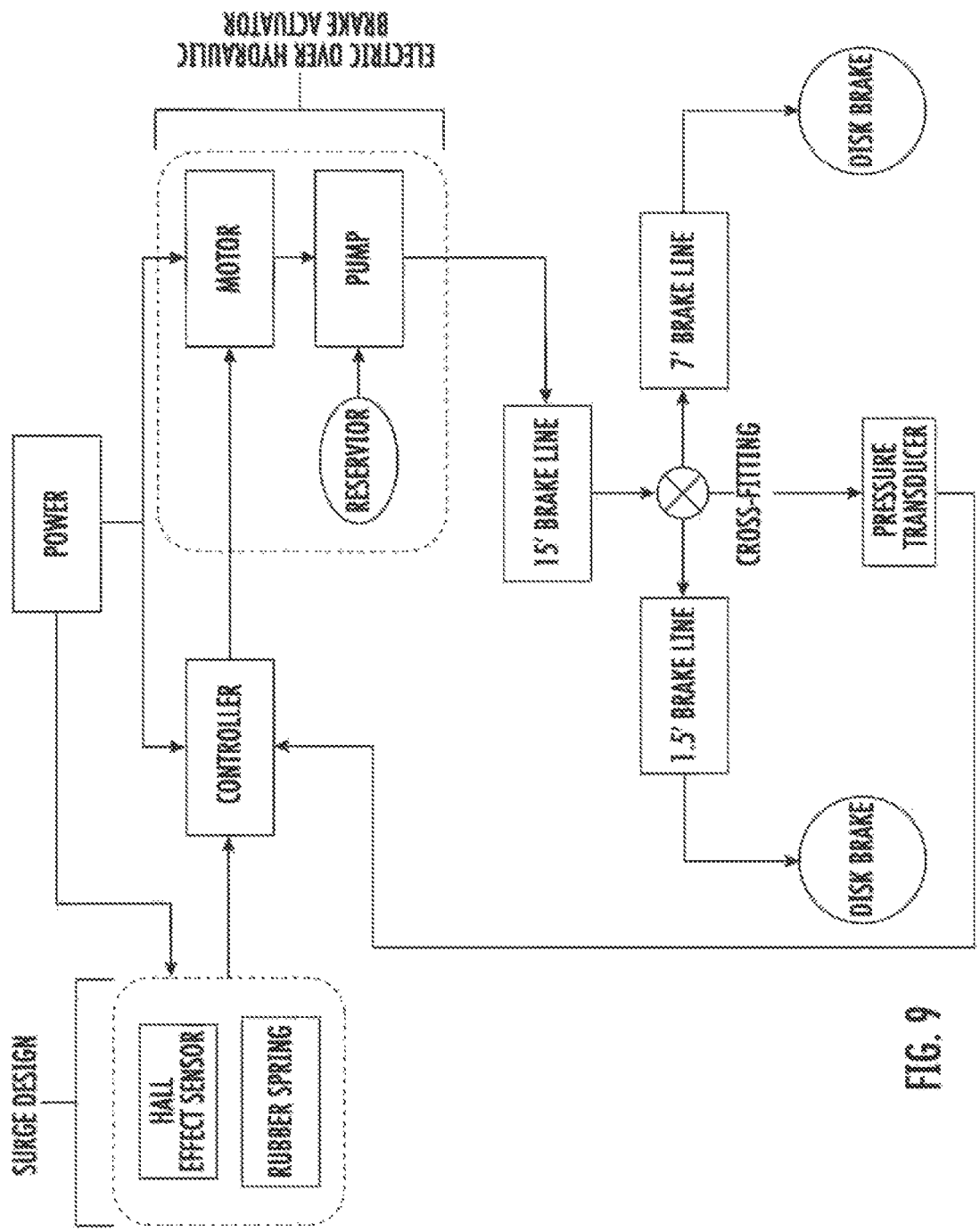
FIG. 9 is a flow chart of the surge design electrically coupled to the controller and motor.

FIG. 9 is a flow chart of the surge design electrically coupled to the controller and motor. Power is provided to the motor, the controller and a surge design for operation of the hall effect sensor. When the surge design measures vehicle displacement a signal is directed to the controller for operating the electric over hydraulic brake actuator, wherein the electric motor operates a hydraulic pump coupled to a hydraulic reservoir. The hydraulic pump is fluidly coupled to a brake line having a cross fitting for operating a left disk brake and a right disc brake. A pressure transducer monitors the hydraulic pressure providing an input to the controller.

Figure 10:
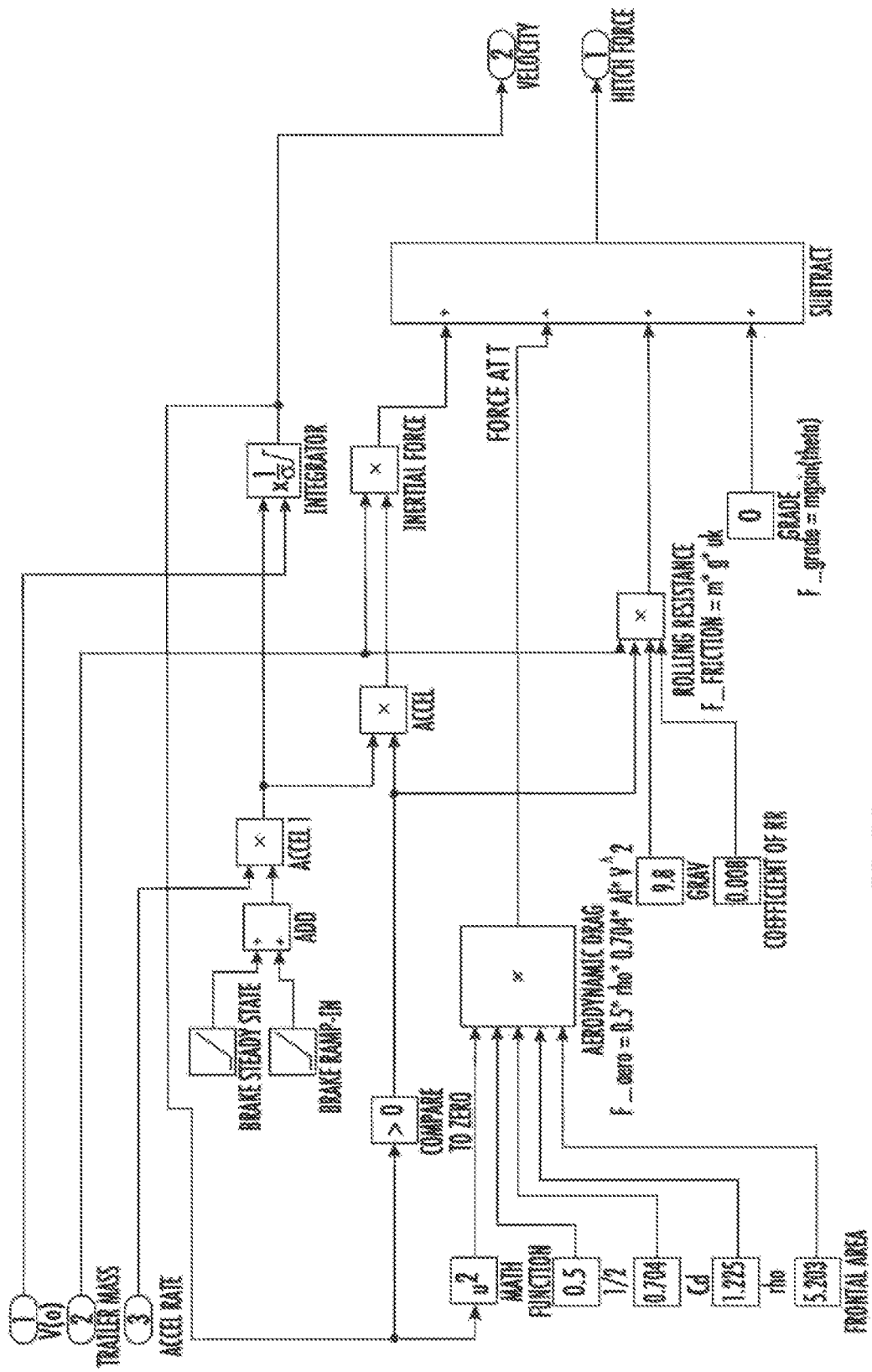
FIG. 10 is a flow chart of trailer mass resistance detection and acceleration rate.

FIG. 10 is a flow chart of controller logic with sensors providing an input regarding velocity, trailer mass resistance detection and acceleration rate. The initial velocity is adjusted by the brake steady state and brake ramp using an integrator to determine final velocity. The initial trailer mass and acceleration rate are adjusted using an acceleration rate adjusted by the Brake Steady Stae and Brake ramp as modified by an inertial force; used in combination with an aerodynamic drag calculation coupled to frontal area sensors; used in combination with an adjustment to the trailer mass using a rolling resistance calculated by gravity and the coefficient of rolling resistance; used in combination with a grade determination.

Figure 11:
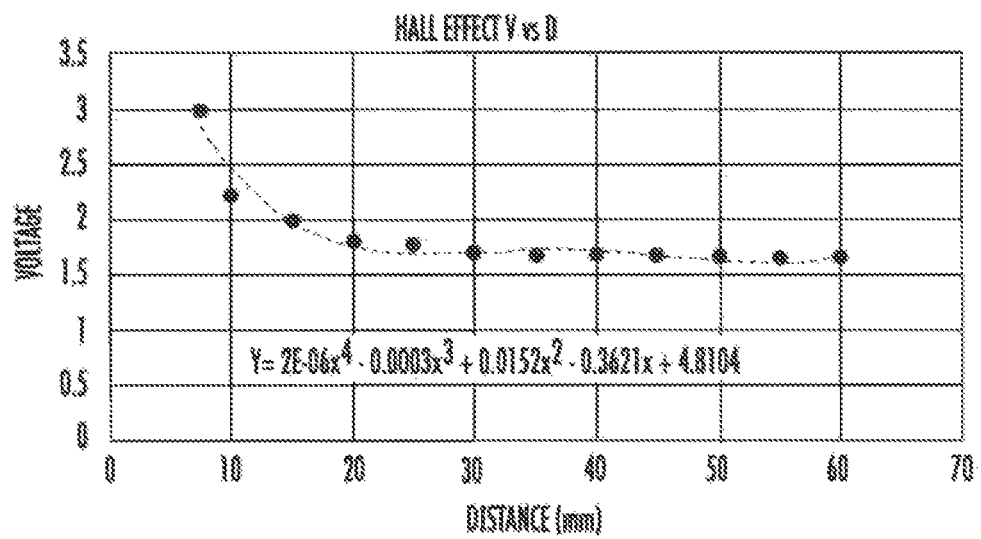
FIG. 11 is a chart depicting Hall Effect voltage versus distance.
Figure 12:
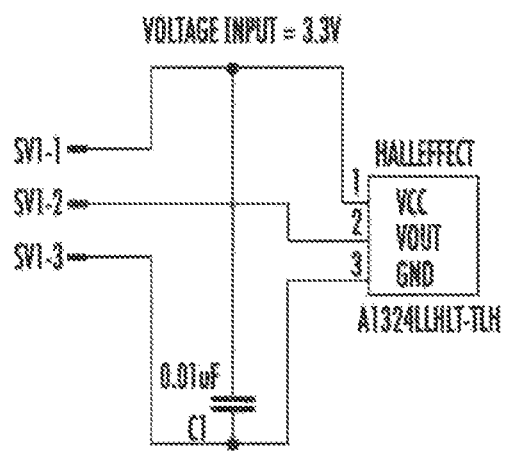
FIG. 12 is an electrical schematic of the microcontroller to the sensors for the Hall Effect.
Figure 13:
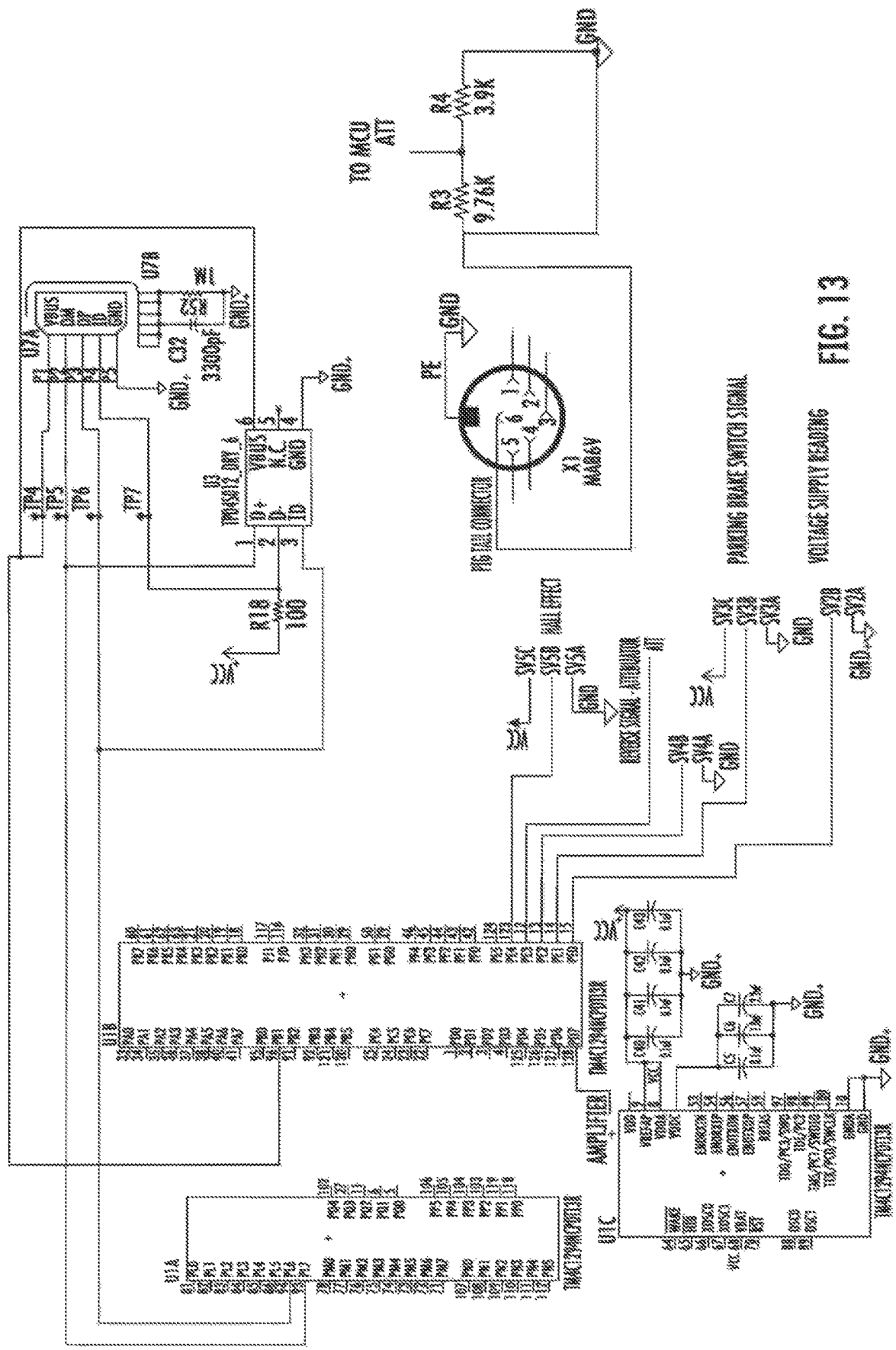
FIG. 13 is an electrical schematic of the controller.
Figure 14:
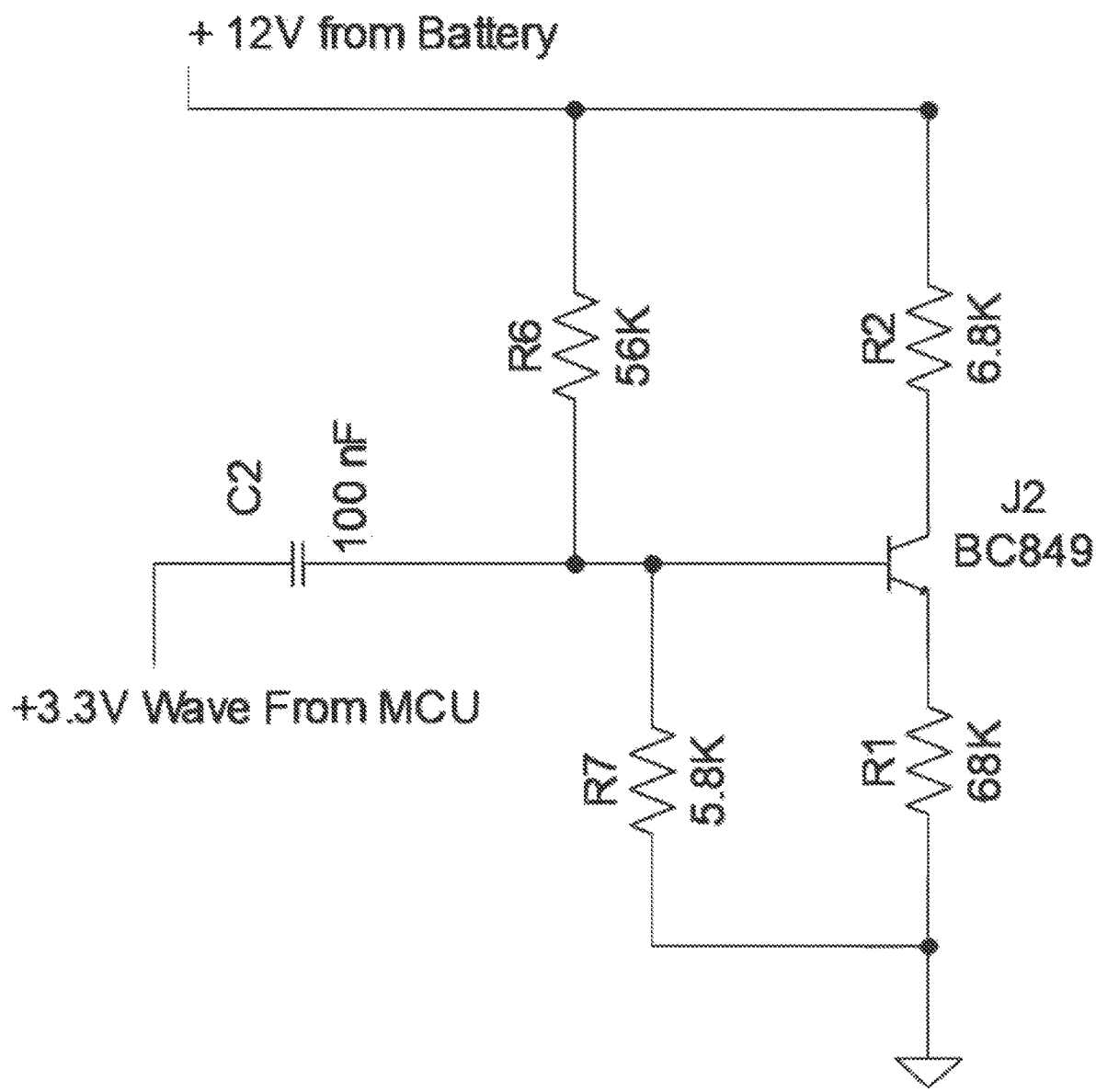
FIG. 14 is an electrical schematic coupling a battery source to the microcontroller.
Figure 11B:
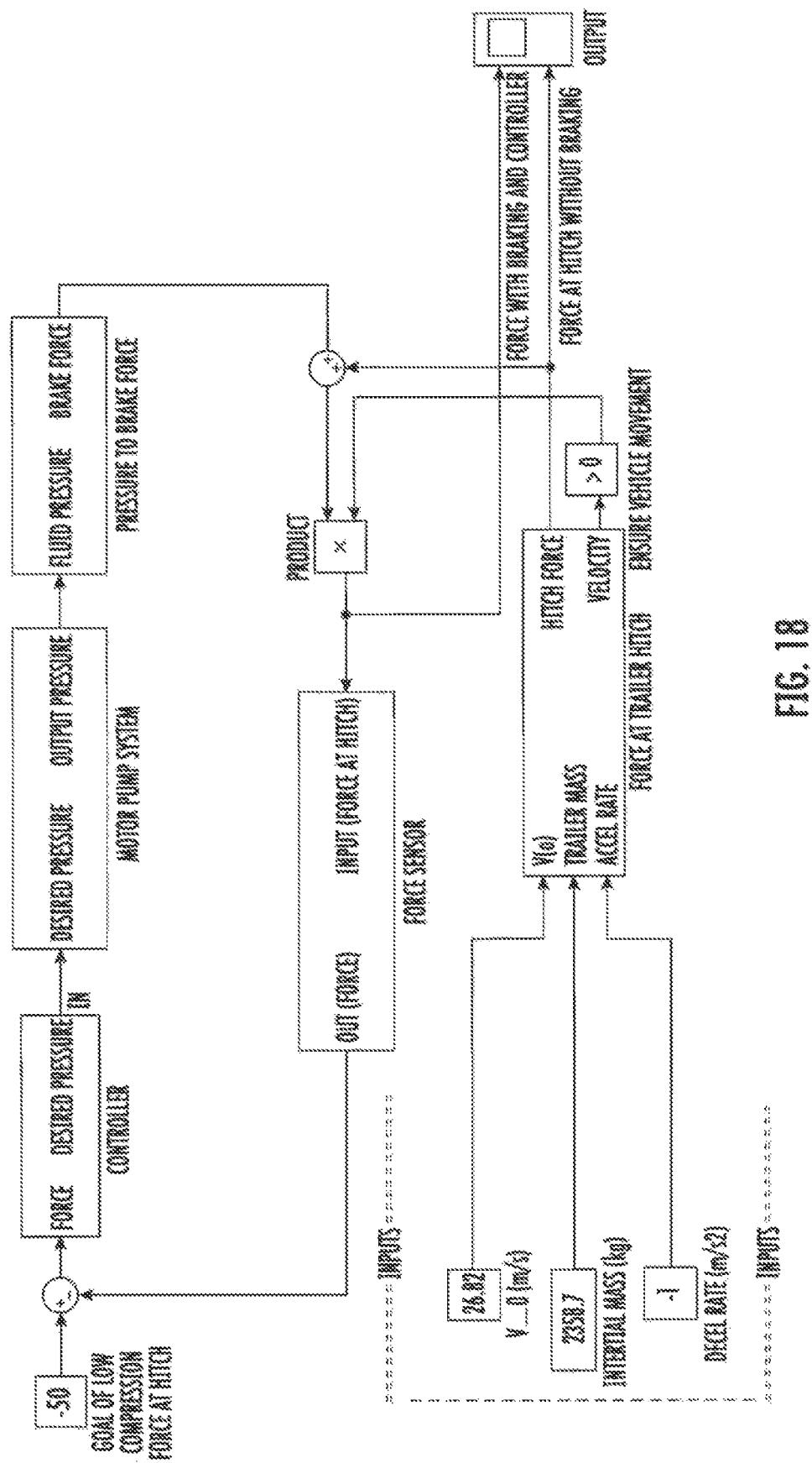

FIG. 11 is a chart depicting Hall Effect voltage versus distance. The distance measured in mm. FIG. 12 is an electrical schematic of the microcontroller to the sensors for the Hall Effect. FIG. 13 is an electrical schematic of the controller. FIG. 14 is an electrical schematic coupling a battery source to the microcontroller.

FIG. 15 is a graph depicting step response of plant along without feedback, comparing amplitude in seconds. FIG. 16 is a graph depicting step response with PID, feedback, comparing amplitude in seconds. FIG. 17 is chart depicting settling time for a plant alone and a plant and controller.

Figure 19:
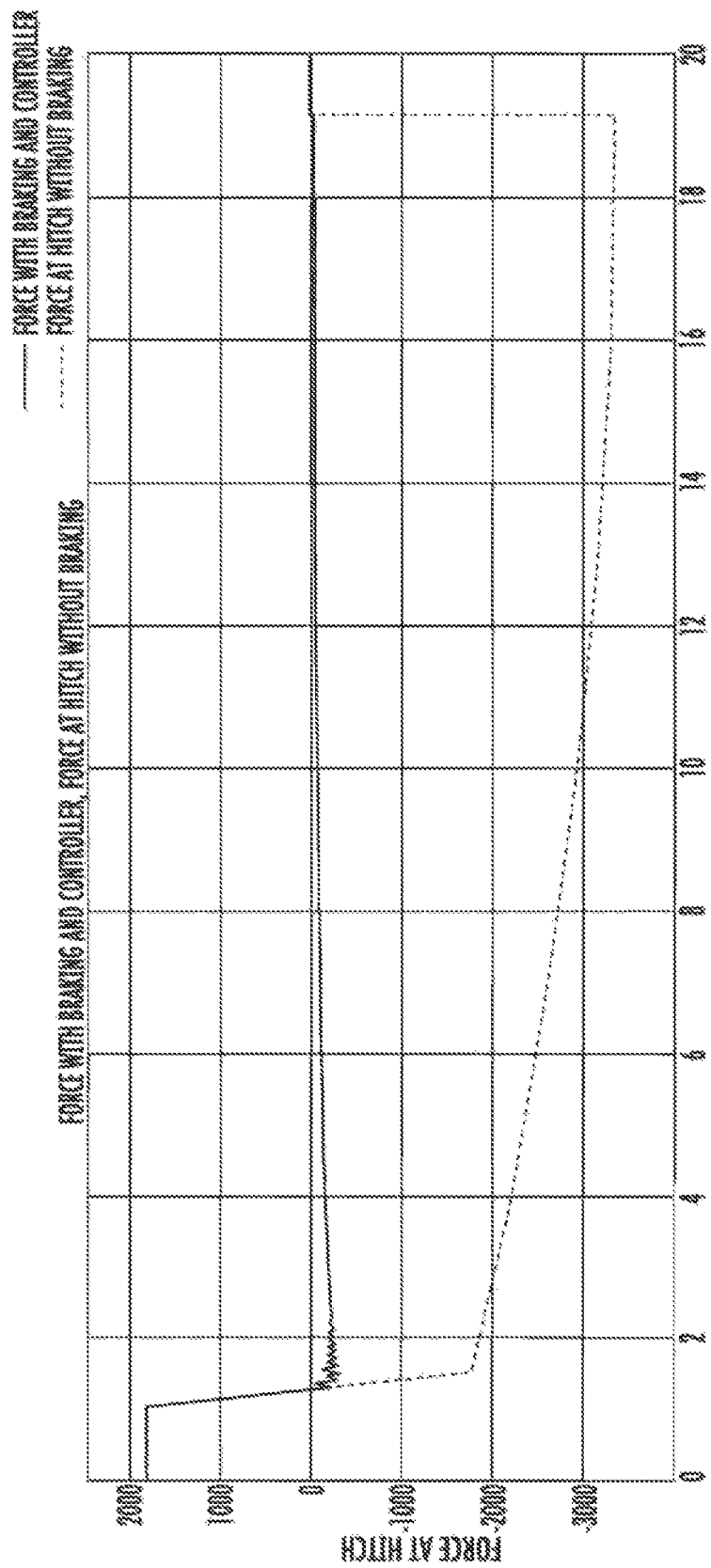
FIG. 19 is a graph of force at hitch with braking and controller, and force at hitch without braking.
Figure 20:
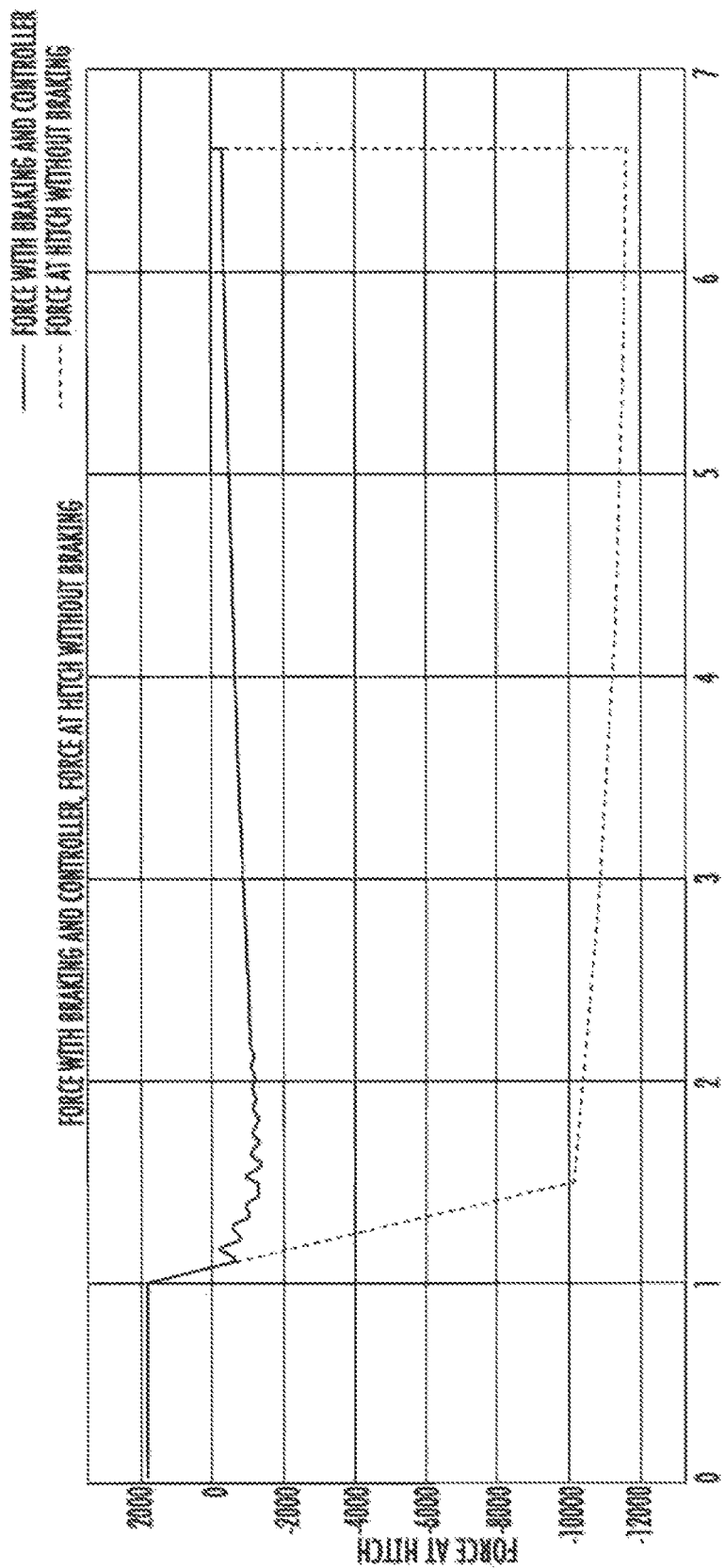
FIG. 20 is a graph of an emergency brake response of force at hitch with braking and controller, and force at hitch without braking.

FIG. 18 is a flow diagram force, desired pressure and brake force. The controller is used to calculate the force and desired pressure, the desired pressure is used to operate the motor pump system to create and output pressure, the output pressure is the fluid pressure for applying brake force. A force sensor detects input of force at the hitch as data to the controller. The force sensor receiving inputs in the form of velocity, inertial mass and deceleration rate. A sensor is used to ensure vehicle movement with a controller input for detecting force with braking and or force at hitch without braking. FIG. 19 is a graph illustrating the force with braking and controller and the force at hitch without braking. FIG. 20 is a graph of an emergency brake response depicting the force with braking and controller, and force at hitch without braking.

All patents and publications mentioned in this specification are indicative of the levels of those skilled in the art to which the invention pertains. It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The term "about" means, in general, the stated value plus or minus 5%. The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed.

What is claimed is:

1. An improved trailer mounted braking system to pressurize a brake system upon detection of deceleration to provide a faster response time when operator brake pressure is applied, said braking system comprising:

a trailer formed from a frame having a predetermined mass, said frame having a tongue section leading to bifurcated rails on a rear section with an axle coupled to each rail, said axle having a wheel and hydraulically operated brake rotatably coupled to each end of said axle;

a surge component coupled to said tongue section, said surge component having a sliding coupler housing a forward and rearward spring retainer securing a rubber spring and spring spacer by use of a spring guide pretension bolt extending therethrough;

a trailer coupler having a first end secured to said surge component and a second end available for securement to a towing vehicle;

a controller attached to said surge component, said controller coupled to a magnetic sensor for calculating vehicle deceleration by measuring compression of said surge component rubber spring;

an electric over hydraulic brake actuator comprising an electric motor electrically coupled to said controller and rotatably coupled to a hydraulic pump that is fluidly coupled to disc brakes;

wherein as the tow vehicle decelerates the mass of the trailer forces the sliding coupler to compress wherein said controller directs said electric motor to build pressure in the hydraulically operated disc brakes with said controller determining the speed of deceleration for varying a signal to said electric motor to adjust the hydraulic pressure to the brakes.

2. The trailer mounted braking system according to claim 1 wherein said electric over hydraulic brake actuator hydraulic surge actuator is formed integral with said trailer coupler.

3. The trailer mounted braking system according to claim 1 wherein a signal from said controller is used to detect compression of said spring wherein deflection of said rubber spring causes a magnet to move closer to a Hall Effect sensor increasing a magnetic field seen by said Hall Effect sensor.

4. The trailer mounted braking system according to claim 1 wherein said controller is electrically coupled to a tow vehicle brake light circuit, wherein said controller is powered when a tow vehicle brake light circuit is activated.

5. The trailer mounted braking system according to claim 1 wherein said controller calculates hydraulic pressure in response to trailer frame deceleration.

6. The trailer mounted braking system according to claim 1 wherein said controller disables in response to trailer frame reversing.

7. The trailer mounted braking system according to claim 1 wherein said electric motor is a 12 VDC motor driving an axial piston pump.

8. The trailer mounted braking system according to claim 7 including a pressure transducer to provide feedback for adjusting axial piston pump rotation.

9. The trailer mounted braking system according to claim 1 wherein said brake system consists of disc brakes.

10. The trailer mounted braking system according to claim 1 wherein said brake system is constructed and arranged to control drum brakes.

11. The trailer mounted braking system according to claim 1 including a pigtail signal to detect when a tow vehicle is in reverse to override said brake pressurization.

12. The trailer mounted braking system according to claim 1 wherein said pump generates hydraulic pressure between 500-1600 psi.

13. The trailer mounted braking system according to claim 1 wherein said pump generates hydraulic pressure of at least 900 psi within 1.0 seconds of activation.

14. The trailer mounted braking system according to claim 1 wherein said controller provides vehicle acceleration/deceleration data in less than 0.5 seconds.

* * * * *

UNITED STATES PATENT AND TRADEMARK OFFICE
CERTIFICATE OF CORRECTION

| | | |
|---|---|---|
| PATENT NO. | : 12,005,877 B2 | |
| APPLICATION NO. | : 17/313544 | |
| DATED | : June 11, 2024 | |
| INVENTOR(S) | : Stearns et al. | |

It is certified that error appears in the above-identified patent and that said Letters Patent is hereby corrected as shown below:

In the Claims

Column 9 Line 2, Claim 2 delete "Hydraulic surge actuator"

Signed and Sealed this
Twelfth Day of November, 2024

Katherine Kelly Vidal
*Director of the United States Patent and Trademark Office*